United States Patent [19]
Channon et al.

[11] 3,849,248
[45] Nov. 19, 1974

[54] SAMARIUM COMPENSATION FOR NUCLEAR REACTOR FUEL

[75] Inventors: Frederick R. Channon; David L. Fischer, both of San Jose, Calif.

[73] Assignee: General Electric Company, San Jose, Calif.

[22] Filed: Oct. 27, 1971

[21] Appl. No.: 193,221

Related U.S. Application Data

[63] Continuation of Ser. No. 799,467, Feb. 14, 1969, abandoned.

[52] U.S. Cl. ............... 176/68, 176/76, 176/78, 176/86 R, 176/93 BP
[51] Int. Cl. ....... G21c 3/04, G21c 7/02, G21c 7/24
[58] Field of Search ............ 176/10, 17, 18, 20, 22, 176/27, 33, 35, 37, 40, 66, 67, 76, 78, 86 R, 93, 93 BP, 68

[56] References Cited
UNITED STATES PATENTS

| | | | |
|---|---|---|---|
| 2,843,539 | 7/1958 | Bornstein | 176/93 BP |
| 3,122,484 | 2/1964 | Iskenderian | 176/93 R |
| 3,255,092 | 6/1966 | Dee, Jr. | 176/93 R |
| 3,365,367 | 1/1968 | Dolle | 176/22 |
| 3,427,222 | 2/1969 | Biancheria et al. | 176/93 R |
| 3,501,411 | 3/1970 | Triggiani | 176/93 R |

OTHER PUBLICATIONS

Lamarsh, Introduction to Nuclear Reactor Theory, 1966, pages 467–478.

Primary Examiner—Carl D. Quarforth
Assistant Examiner—Roger S. Gaither
Attorney, Agent, or Firm—Ivor J. James; Samuel E. Turner; Sam E. Laub

[57] ABSTRACT

A system of burnable poison adapted to compensate for the lack of samarium in new nuclear fuel.

9 Claims, 8 Drawing Figures

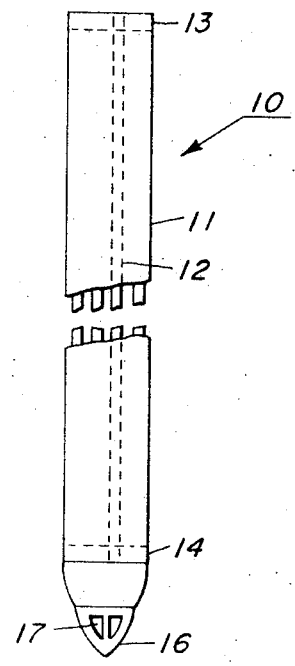
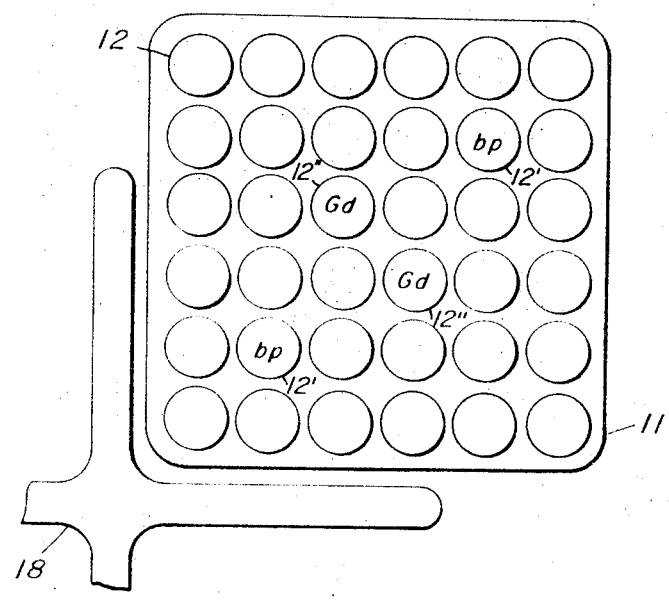
Fig. 1
Fig. 2
INVENTORS:
FREDERICK R. CHANNON
DAVID L. FISCHER
BY: *Samuel E. Turner*
ATTORNEY

SAMARIUM COMPENSATION FOR NUCLEAR REACTOR FUEL

This is a continuation, of application Ser. No. 799,467, filed Feb. 14, 1969 now abandoned. The release of large amounts of energy through nuclear fission reactions is now well known. Briefly, a fissile atom, such as U-235, absorbs a neutron in its nucleus and undergoes a nuclear disintegration which produces on the average two fission products of lower atomic weight with great kinetic energy and several neutrons also a high energy. The energy is dissipated as heat in the fuel elements of the reactor. This heat may be removed by passing a coolant in heat exchange relation to the fuel and the heat can be extracted from the coolant to perform useful work.

If a nuclear reactor is to operate at a steady state power level, the fission inducing neutron population must remain constant. That is, each fission must produce a net of one neutron which induces a subsequent fission so that the fission reaction is self-sustaining. Thus, steady state operation of the reactor system, the neutron reproduction ratio or effective multiplication factor $K_{eff}$ (defined as the ratio of the neutron population at a given time to the neutron population one finite neutron lifetime earlier) must be at unity, whereat the system is said to be "just critical".

In commonly used nuclear power fuel, fertile materials such as U-238 are included in addition to the fissile atoms. However, in a thermal reactor (a reactor in which most of the fissions are caused by thermal neutrons) the rate of production of fissile atoms is less than the rate of fissile atom consumption. Thus as the neutron-fission chain reaction proceeds, the nuclear fuel is depleted, that is, the number of atoms of fissile material decreases. In addition, some of the fission products such as xenon and samarium are neutron absorbers or "poisons". Thus if the reactor is to have a reasonable lifetime of power gneration the fuel core must include an initial excess of nuclear fuel which results in an initial excess of reactivity. The excess reactivity may be defined as the amount by which the uncontrolled multiplication factor exceeds unity. This excess reactivity requires a control system of sufficient strength to maintain the effective multiplication factor at unity during reactor operation. The control system customarily comprises neutron absorbing or poison materials that serve to control the neutron population by non-fission absorption or capture of neutrons. Typically, the control system includes mechanical control in the form of a plurality of selectively actuatable, poison containing control rods or the like which can be inserted into and withdrawn from the core as required.

As mentioned above, some of the fission products are neutron absorbers or poisons. Notable among these is the nuclide samarium-149. For example, Sm-149 atoms are formed in about 1.4 percent of the fissions of U-235 primarily by the following $\beta$ decay chain:

$Nd^{149}$ 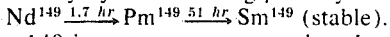 $Pm^{149}$ $\xrightarrow{51\ hr}$ $Sm^{149}$ (stable).

Sm-149 is a strong neutron poison because of its high neutron capture cross section. Sm-149 absorbs a neutron to become Sm-150, the latter having a relatively low neutron capture cross section.

Since Sm-149 is stable, it will build up in the reactor, in a relatively short time such as a few weeks, to an equilibrium concentration where the production rate is equal to the burnup rate. The fuel core must thus include an excess of fissile material not only to compensate for fuel depletion but also to provide an additional excess of reactivity to compensate for the poison effect of the equilibrium concentration of Sm-149. For a typical fuel cycle in which the maximum reactivity occurs at the start of the cycle with fresh fuel, the control system must provide additional control strength to offset this additional reactivity for the short time taken to reach the equilibrium concentration of Sm-149. It is found costly and wasteful to provide this additional control strength in the mechanical control system and it has been proposed to include a burnable poison in the core for this purpose. For example, U.S. Pat. No. 2,843,539, by I. Bornstein describes the addition of an initial amount of Sm-149 to a reactor core to compensate for this additional excess reactivity during the period of Sm-149 buildup.

In addition to the problem of Sm-149 buildup, another problem in the design of a reactor core arises from the fact that the control strength of the control system increases from the cold shutdown condition to the hot operating condition of the reactor. In practical effect this means that the total required control strength is determined by the cold shutdown requirements and margin while the control strength is greater than required for the hot operating condition. This effect is due primarily to the increase in neutron diffusion length with the decreased density of the moderator and the decreased absorption cross section of the fuel from the cold to hot condition. In other words, in the hot condition the neutrons travel further before they are absorbed and, therefore, the likelihood of capture by the poision of the control system is increased. Thus, this effect creates a problem in the balance between the reactivity control required to meet the cold shutdown margin and the amount of reactivity control that must be removed to achieve the hot operating reactivity required for full power operation. This problem is especially important in a reactor core where a relatively large percentage of the control strength is provided by a system of fixed self-shielded burnable poison such as shown by D. L. Fischer et al. in copending U.S. patent application Ser. No. 708,391, filed Feb. 26, 1968.

It is an object of the invention to provide burnable poison to compensate for the initial lack of fission product poisoning in new fuel without sacrifice of cold shutdown or hot operating margins.

It is another object of the invention to increase the hot operating reactivity margin of a reactor core using self-shielded burnable poison for burnup compensation with a given mechanical control system and a given cold shutdown margin.

These and other objects of the invention are achieved by utilizing a dilute or non-self-shielded burnable poison which has an energy dependent absorption cross section that decreases more rapidly than l/v with increased neutron energy to provide the control strength necessary to compensate for the initial lack of Sm-149 in the core. Gadolinium is a suitable burnable poison for this purpose and its use in accordance with the invention can actually provide an increase, rather than a decrease, in the cold shutdown margin or, alternatively, an increase in the hot operating reactivity.

The invention is described more specifically hereinafter with reference to the accompanying drawing wherein:

FIG. 1 is an elevation view of a typical fuel assembly;

FIG. 2 is a schematic plan view of a fuel assembly;

Figure 3:
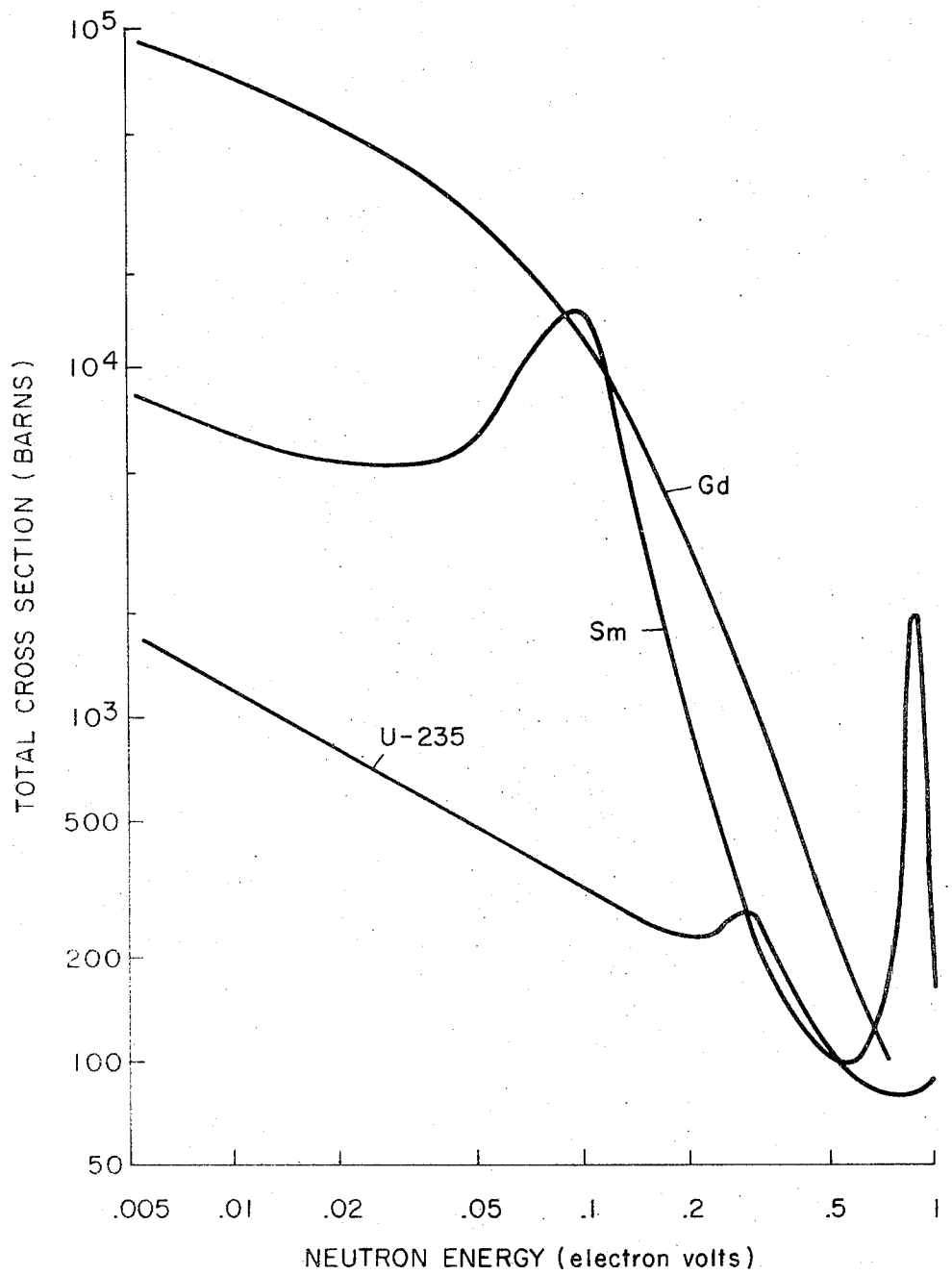
FIG. 3 illustrates the thermal energy dependent microscopic cross sections of uranium, samarium and gadolinium.

While not limited thereto, the present invention is adaptable for use in a fluid cooled and moderated reactor. In a known type of water reactor, for example as used in the Dresden Nuclear Power Station near Chicago, Illinois, the reactor core is of the heterogeneous type, that is, the nuclear fuel is in the form of elongated, cladded rods. These fuel rods or elements are grouped together and contained in open-ended tubular flow channels to form separately removable fuel assemblies or bundles. A sufficient number of fuel assemblies are arranged in a matrix, approximating a right circular cylinder, to form the nuclear reactor core capable of self-sustained fission reaction. The core is submersed in a fluid, such as light water, which serves both as a coolant and as a neutron moderator. The control system includes mechanical control in the form of a plurality of control rods, containing neutron absorbing material, which are selectively insertable among the fuel assemblies to control the reactivity of the core.

A typical fuel assembly 10 is illustrated in elevation view in FIG. 1. The fuel assembly 10 comprises a tubular flow channel 11 of square cross section containing, for example, a 6 × 6 array of spaced fuel elements or rods 12 supported between upper and lower tie plates 13 and 14. A nose 16 is provided with openings 17 through which the coolant is received to flow upward past the fuel elements. (A fuel assembly is shown in greater detail by D. A. Venier et al. in U.S. Pat. No. 3,350,275.) The fuel elements 12 may be formed of a tube containing a plurality of cylindrical pellets of fuel as shown, for example, by J. L. Lass et al. in U.S. Pat. No. 3,365,371. Typically the fuel is in the form of an oxide such as uranium dioxide $UO_2$.

The fuel assembly 10 is illustrated in schematic plan view in FIG. 2 together with a control rod 18 of cruciform shape. Certain of the fuel rods, such as fuel rods 12' (legended *bp*), bp), may contain self-shielded burnable poison to offset the reactivity of the excess fuel provided in the core to compensate for fuel depletion during the fuel cycle. A system of self-shielded burnable poison for this purpose is described, for example, by D. L. Fischer et al. in the above-mentioned copending patent application Ser. No. 708,391. In accordance with the present invention a dilute burnable poison is provided to compensate for the initial lack of Sm-149 in the core. (By dilute is meant that the density and distribution of the burnable poison is such that the poison is not substantially self-shielding.) This samarium-compensating burnable poison may be uniformly distributed throughout the new fuel or, advantageously from the viewpoint of fabrication, the samarium-compensating burnable poison, such as Gd, may b contained in one or more of the fuel rods, such as in fuel rods 12'', of a selected plurality of the new fuel assemblies of the core.

Methods and procedures for determining the effects of fission product poisoning may be found in reactor physics handbooks such as *The Naval Reactor Physics Handbook*, Volume I, A. Radkowsky editor, Atomic Energy Commission, 1964.

Briefly, the rate of formation of Sm-149 is a function of the rate of fission. The number of Sm-149 atoms present in the core at any given time is equal to the number of Sm-149 atoms formed minus the number of Sm-149 atoms removed by neutron capture. Thus the rate of Sm-149 buildup is given by the following relation:

$$dN_{Sm}/dt = Y\, \sigma_f\, N_f \phi - \sigma_c^{Sm} N_{Sm} \phi,$$

(1)

where:
- $Y$ is the fractional yield of Sm-149 atoms per fission of the fuel.
- $\sigma_f$ is the microscopic fission cross section of the fuel (barns),
- $N_f$ is the concentration of fuel atoms (atoms/cm$^3$),
- $\phi$ is the thermal neutron flux (neutrons/cm$^2$-sec),
- $\sigma_c^{Sm}$ is the microscopic capture cross section of Sm-149 (barns), and
- $N_{Sm}$ is the concentration of Sm-149 atoms (atoms/cm$^3$).

At equilibrium the rate of formation and the rate of burnup of Sm-149 are equal. Thus at equilibrium:

$$\sigma_c^{Sm}\, N_{Sm} \phi = Y\, \sigma_f\, N_f \phi$$

(2)

(It is seen that the equilibrium concentration of Sm-149 is independent of the flux $\phi$; however, the time required to reach equilibrium is flux dependent and is equal to about $5/\sigma_c^{Sm}\phi$ seconds.)

At equilibrium the ratio of the number of Sm-149 atoms to fuel atoms is equal to the ratio of concentrations, thus from (2):

$$\text{Sm-149 atoms/fuel atoms} = N_{Sm}/N_f = Y\, \sigma_f/\sigma_c^{Sm}$$

(3)

The control strength $\Delta$of of a poison is proportional to its macroscopic cross section $\Sigma$ which is the product $N\sigma$ of its concentration and microscopic cross section. Thus, in general, the burnable poison which is used to compensate for the lack of Sm-149 in new fuel is selected to provide a macroscopic cross section equivalent to the macroscopic cross section of the equilibrium concentration of Sm-149. Thus for a control strength equivalent to equilibrium Sm-149:

$$\Sigma^{bp} = \Sigma^{Sm} = N_{bp}\, \sigma_c^{bp} = N_{Sm}\, \sigma_c^{Sm}$$

(4)

where:
- $\Sigma^{bp}$ is the macroscopic cross section of the selected burnable poison (cm$^{-1}$),
- $\Sigma^{Sm}$ is the macroscopic cross section of equilibrium Sm-149 (cm$^{-1}$), and
- $\sigma_c^{bp}$ is the microscopic capture cross section of the selected burnable poison (barns).

The ratio of the number of atoms of the selected burnable poison to number of fuel atoms is found by combining (3) and (4):

burnable poison atoms/fuel atoms = $Y \sigma_f/\sigma_c^{bp}$ (5)

The amount of reactivity controlled by a poison, that is, its control strength $\Delta kp$, is proportional to the neutron absorption of the poison relative to the total neutron absorption, thus:

$$\Delta kp = \frac{\sum_a^p (\text{thermal neutron absorption by the poison})}{\sum_a^t (\text{total thermal neutron absorption})} \quad (6)$$

In accordance with the present invention, to decrease the change in strength of the reactivity control from the cold shutdown to hot operating condition, a samarium-compensating burnable poison is selected which has a cross section that rapidly decreases with increased thermal neutron energy. Gadolinium is found to be a suitable burnable poison for this purpose.

The microscopic cross sections of gadolinium, samarium and uranium-235 over the thermal neutron energy range are compared in FIG. 3. It is seen that the cross section (and hence the reactivity) of U-235 decreases with increased neutron energy at about the usual l/v rate (where v is the neutron velocity). Samarium displays a rather large resonant peak at about 0.1 electron volt. Thus in changing from the cold condition to the hot operating condition, the control strength of samarium does not decrease as rapidly as the decrease in neuron absorption of the fuel with the result that the control strength of the samarium suffers an increase.

The advantage of gadolinium results from the rapid decrease of its cross section with increasing neutron energy and from the absence of resonances in its cross section over the thermal neutron energy range. Thus the control strength of gadolinium decreases more rapidly than the decrease in neutron absorption of the fuel with the desirable result that the control strength of the gadolinium decreases from the cold to the hot operating condition. Thus, as mentioned hereinbefore, the use of gadolinium to compensate for the lack of samarium in new fuel can provide a greater cold shutdown control margin or, alternatively, a greater hot operating reactivity.

Figure 4:
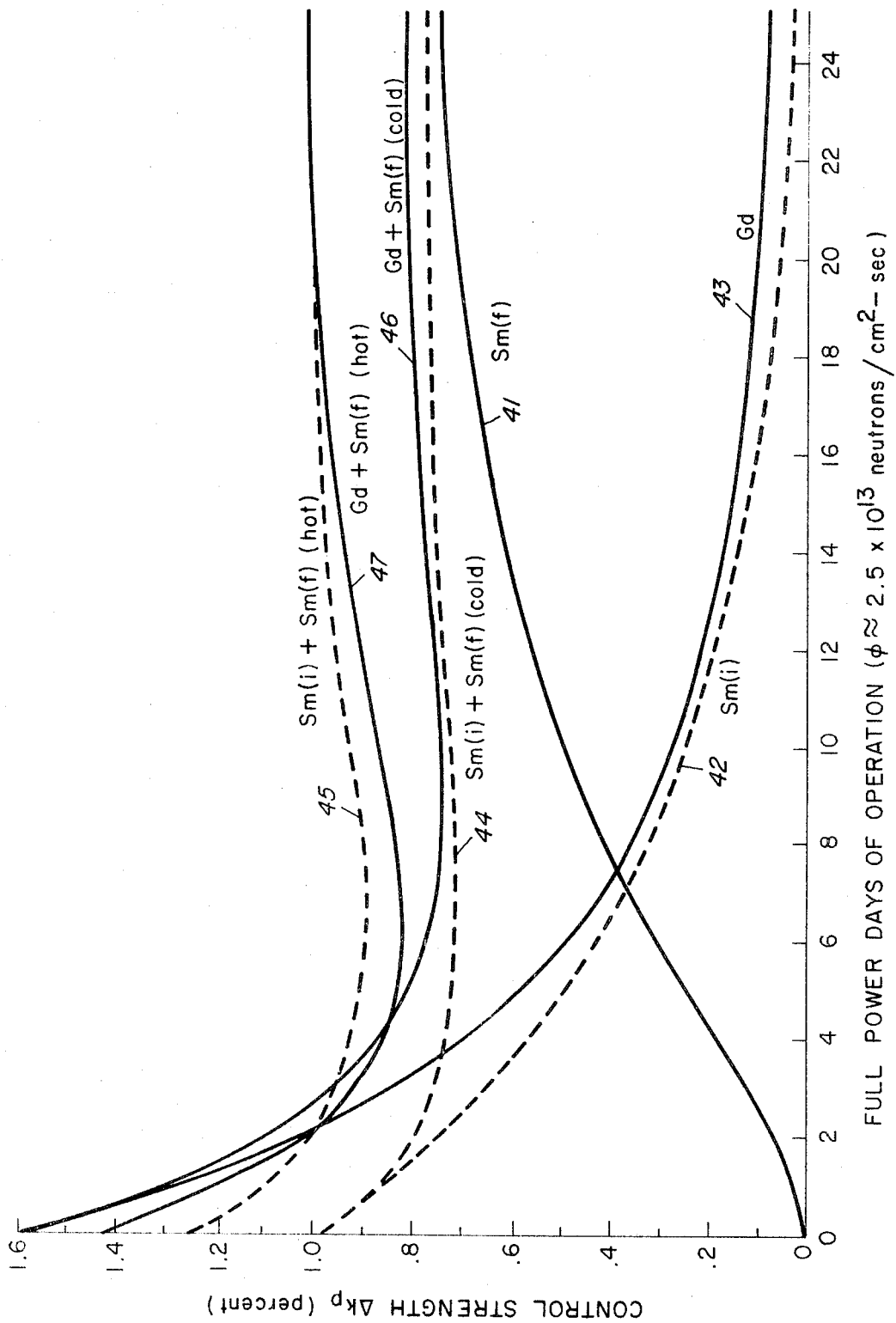
FIG. 4 shows control strength versus operating time curves comparing the use of samarium and gadolinium for samarium compensation.

The advantages of gadolinium as compared to samarium as compensation for the initial lack of samarium is illustrated by the representative control strength versus operating time curves of FIG. 4. A curve 41 illustrates the buildup of samarium Sm(f) during the early period of operation of new fuel. A curve 42 illustrates the burnup of an initial amount of samarium Sm(i) as might be added to compensate for the lack of samarium in the new fuel as suggested in the prior art. A curve 43 illustrates the burnup of an initial amount of gadolinium Gd added to compensate for the lack of samarium in the new fuel in accordance with the present invention. A curve 44 illustrates the combined cold control strengths of the added initial samarium Sm(i) and the samarium Sm(f) being formed. A curve 45 illustrates the combined hot operating control strengths of the initial samarium Sm(i) and the formed samarium Sm(f).

A curve 46 illustrates the combined cold control strengths of the added gadolinium Gd and the samarium Sm(f) being formed, while a curve 47 shows the combined hot operating control strengths of the gadolinium Gd and samarium Sm(f).

Thus FIG. 4 illustrates that the use of initial samarium Sm(i) results in an increase in control strength from the cold to hot operating condition whereas the use of initial gadolinium, in accordance with the present invention, provides a decrease in cold-to-hot control strength for about the first five days of operation of the example of FIG. 4 with a gradual increase in the cold-to-hot strength thereafter as the gadolinium is consumed and the samarium being formed approaches its equilibrium concentration.

Figure 5:
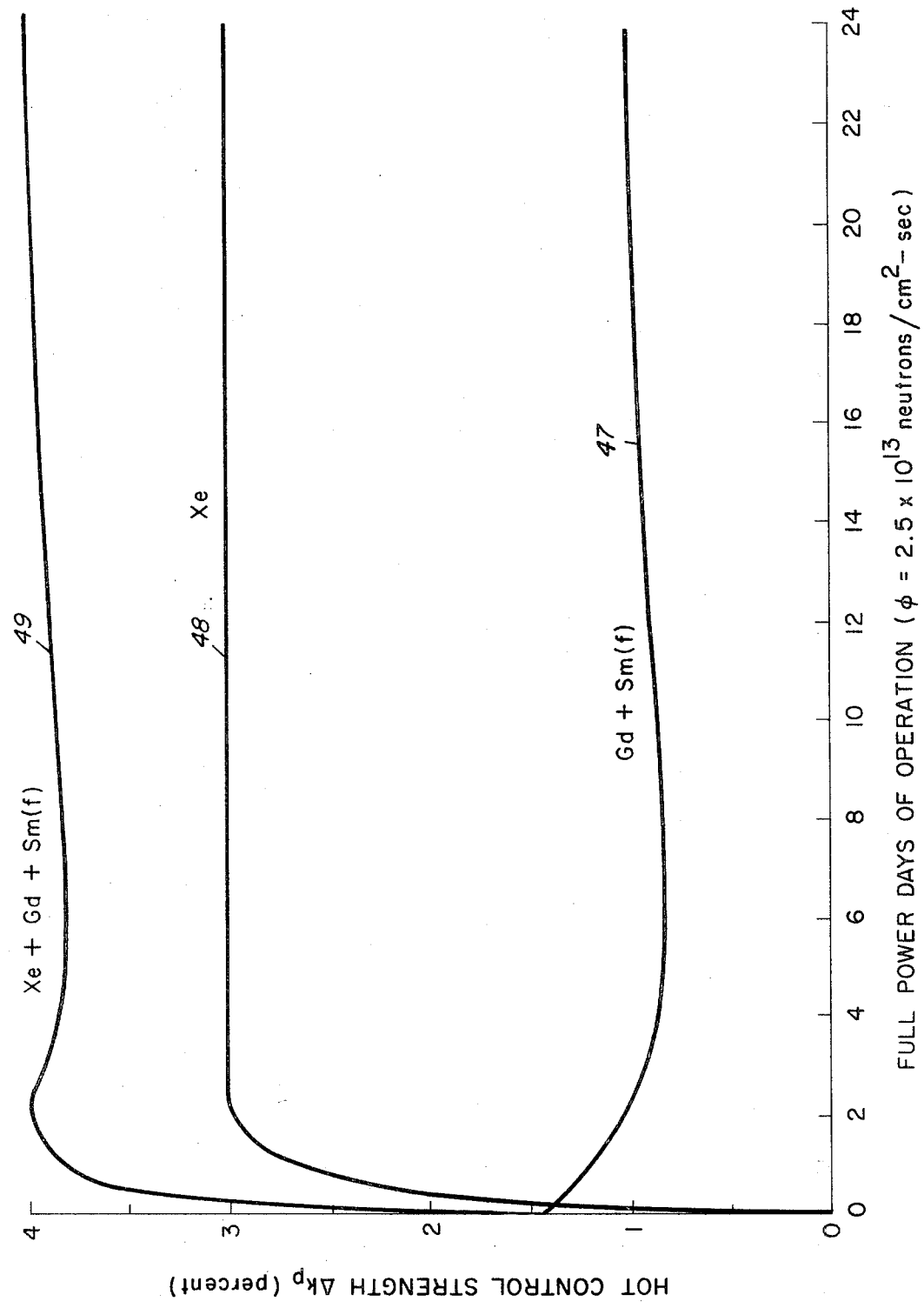
FIG. 5 illustrates the build up of xenon poisoning.

Thus the advantage of initial gadolinium as compared to initial samarium is that an appropriate amount and distribution of gadolinium can be selected for sections during the period of buildup of samarium Sm(f), the cold control strength of Gd + Sm(f) is equal to or greater than the cold control strength of Sm(i) + Sm(f) and for which the hot control strength of Gd + Sm(f) is equal to or less than the hot control strenth of Sm(i) + Sm(f) except during the first few days of exposure when the greater hot control strength of Gd + Sm(f) is compensated for by the lack of initial xenon. The lack of initial xenon and the buildup of xenon in the core is illustrated by a curve 48 in FIG. 5. Also shown in FIG. 5 is the curve 47 (from FIG. 4) and a curve 49. Curve 49 illustrates the combined control strength of initial gadolinium, samarium and xenon which reaches a maxiumum control strength at about two days that is about equal to the combined control strength of samarium and xenon after samarium equilibrium is reached at about 24 days. Thus the use of initial gadolinium to compensate for the initial lack of samarium provides an increase in the cold shutdown margin or, alternatively, an increase in the hot operating margin as illustrated in the examples presented hereinafter.

Figure 6:
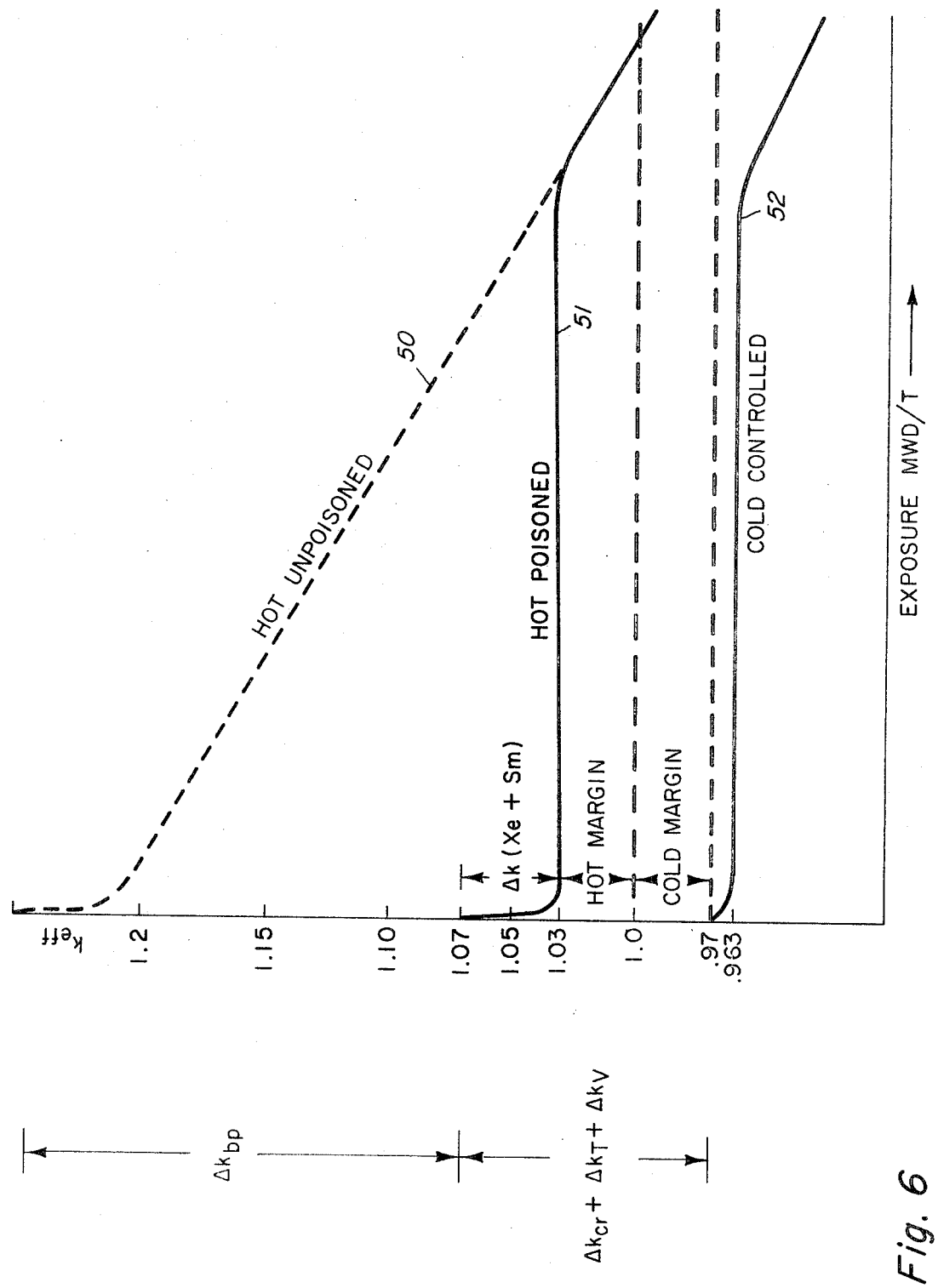
FIGS. 6–8 are curves of effective multiplication constant $k_{eff}$ versus exposure illustrating applications of the present invention.
Figure 7:
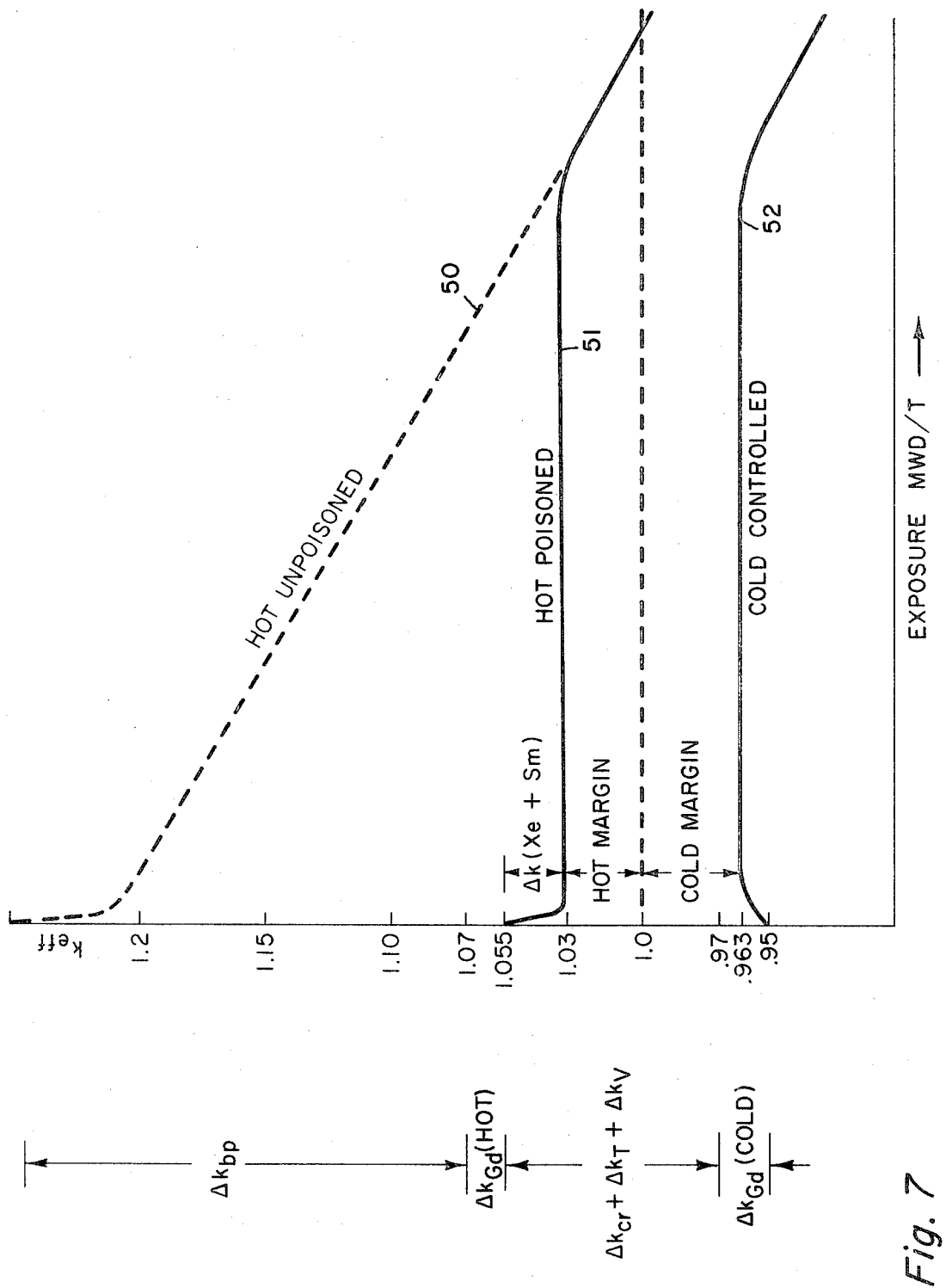
Figure 8:
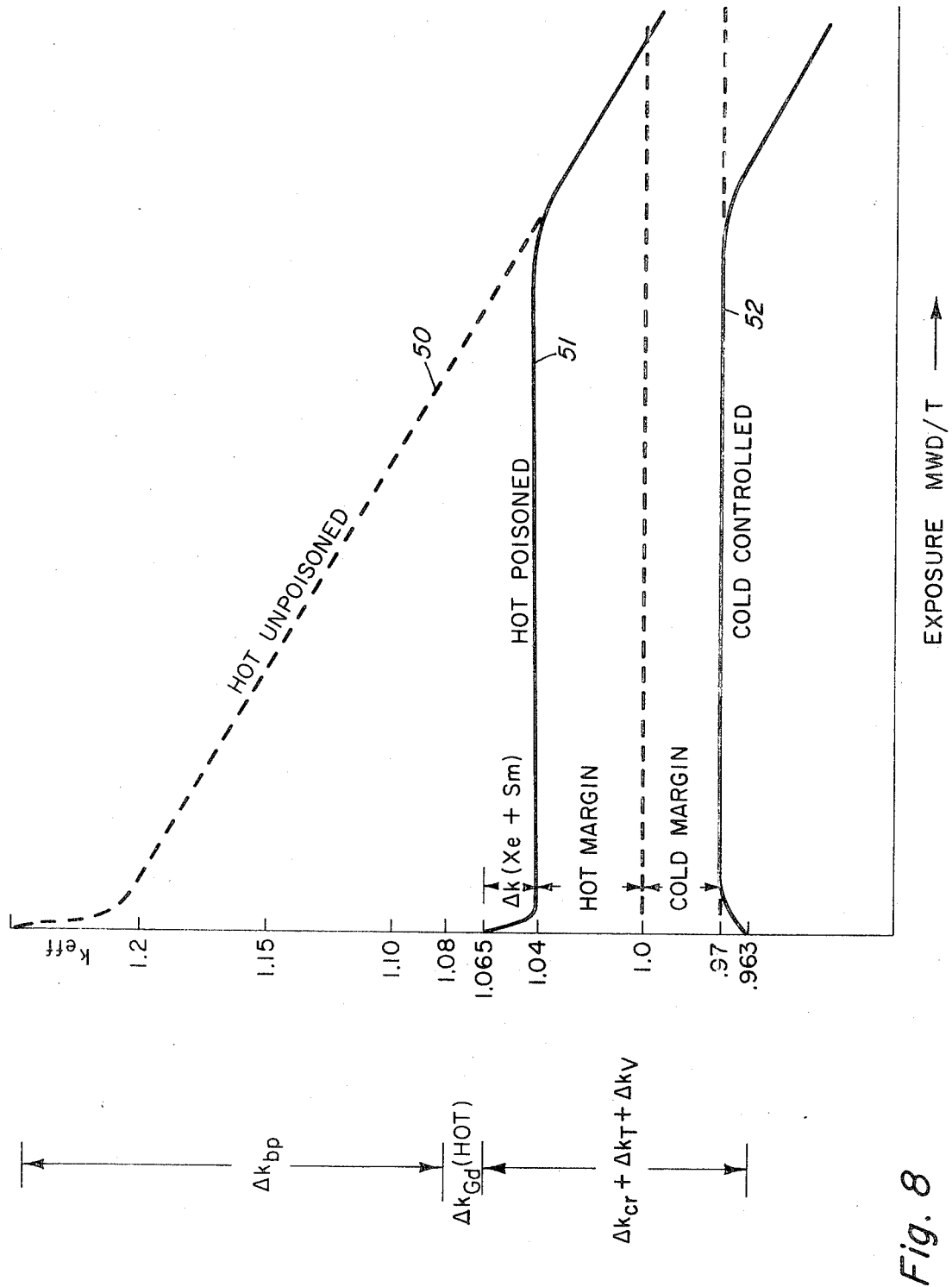

Examples of the application of the present invention are illustrated by FIGS. 6–8 which show the multiplication constant $k_{eff}$ and control strengths of the elements of the reactivity control system as a function of exposure during a fuel cycle. Curves 50 illustrate the hot unpoisoned reactivity of the new fuel; curves 51 illustrate the hot poisoned reactivity; and curves 52 illustrate the cold controlled reactivity.

FIG. 6 illustrates the case in which the reactivity allowance for samarium poisoning is not compensated for by the addition of initial burnable poison. It is assumed that the reactivity allowance for fuel depletion is at least partly offset by a self-shielded burnable poison providing a control strength $\Delta k_{bp}$. The initial rapid drop in reactivity is the result of the buildup of samarium and xenon providing an equilibrium control strength of $\Delta K(Xe + Sm)$. A control strength $\Delta k_{cr}$ is provided by the mechanical control rod system. Temperature effects $\Delta k_T$ and void effects $\Delta k_V$ also occur. In the case of FIG. 5, the hot operating reactivity rapidly drops from 1.07 to 1.03 $k_{eff}$ while the cold reactivity drops from 0.97 to 0.963 as the samarium and xenon build up. Thus in this case the minimum hot reactivity margin is (neglecting the drop near the end of the fuel cycle) 0.03 and the minimum cold shutdown margin is also 0.03.

In the case illustrated in FIG. 7, initial dilute burnable poison such as gadolinium is added which provides a control strength of $\Delta k_{Gd}$ (hot) and $\Delta k_{Gd}$ (cold) to compensate for the initial lack of samarium. The minimum hot operating reactivity (except for the drop at the end of the fuel cycle) remains the same at 1.03 but the maximum cold reactivity is now 0.963 rather than the 0.970 $k_{eff}$ of FIG. 6. Therefore the cold shutdown margin is increased from 0.03 to 0.037. Thus in this case the use of burnable poison to compensate for the initial lack of samarium provides an additional minimum cold shutdown margin of 0.007 $k_{eff}$. This improvement in cold shutdown margin can be realized with or without the use of self-shielded burnable poison as compensation for fuel depletion.

In the case illustrated in FIG. 8 the same amount of dilute gadolinium as in the example of FIG. 7 is added to compensate for the initial lack of samarium. However, an amount of the self-shielded burnable poison provided to accommodate fuel depletion is removed to increase the hot operating reactivity margin. In the example of FIG. 8 an amount of the self-shielded burnable poison is removed to provide a reduction of 0.007 $\Delta k_{bp}$ in the cold condition or about 0.010 $\Delta k_{bp}$ in the hot condition. Thus the cold shutdown margin is maintained at a miniumum of 0.03 as in the example of FIG. 5 while the hot operating margin is increased to 0.04. This increase in hot operating margin from 0.03 to 0.04 $\Delta k_{eff}$ can be of great significance when fueling or refueling a given reactor for greater power and/or longer fuel life because it is usually difficult and expensive or impractical to provide greater control strength in the mechanical control system.

Where gadolinium poison is also being used to compensate for the fuel depletion reactivity allowance, its use for samarium compensation provides the further advantage of reducing manufacturing and processing costs and complications. Furthermore gadolinium can readily be produced in an oxide form which is compatible with presently used oxide forms of nuclear fuel.

Thus what has been described is means for advantageously compensating for the initial lack of samarium in new fuel for a nuclear reactor core.

While illustrative embodiments of the invention have been described herein, modifications and adaptations thereof may be made by those skilled in the art without departure from the spirit and scope of the invention as defined by the following claims.

What is claimed is:

1. A fuel assembly for use with other fuel assemblies in a thermal nuclear reactor core, said core including control rods which are selectively movable into and out of said core to control reactivity thereof, said fuel assembly comprising an array of a plurality of spaced fuel elements containing new nuclear fuel initially lacking an equilibrium amount of samarium, said new fuel providing an excess of reactivity to compensate for said equilibrium amount of samarium which said new fuel will contain after a period of operation in said core, and an initial amount of dilute fixed gadolinium burnable poison in said fuel assembly to absorb neutrons during the period of samarium build-up in said new fuel to equilibrium to compensate for said initial lack of samarium and the said initial excess of reactivity whereby said burnable poison substantially depletes out of said fuel as the samarium builds up to the equilibrium amount, said dilute gadolinium poison having a density and distribution in the fuel assembly such that the poisson will not be substantially self-shielding, said gadolinium being particularly useful in said fuel assembly as compared to other burnable poison in that it has both a neutron capture cross section which decreases more rapidly than l/v and than the cross section of samarium-149 over thermal neutron energy range of from 0.005–0.1 electron volts, and also provides either an increased "cold" shutdown margin or an increased "hot" operating reactivity margin the initial amount of said burnable poison being substantially defined by:

burnable poison atoms/fuel atoms = $Y\ \sigma_f^f/\sigma_c^{bp}$ where $Y$ is the fractional yield of Sm-149 atoms per fission of fuel, $\sigma_f^f$ is the microscopic neutron fission cross section of the fuel, and $\sigma_c^{bp}$ is the microscopic neutron capture cross section of the burnable poison.

2. The fuel assembly of claim 1 wherein said initial amount of said burnable poison is between 1 and 3 times an amount defined by:

burnable poison atoms/new fuel atoms = $Y\ \sigma_f^f/\sigma_c^{bp}$

3. The fuel assembly of claim 1 wherein said burnable poison is mixed with the fuel of said fuel elements.

4. A fuel assembly for use with other fuel assemblies in a nuclear reactor core, said core including control rods which are selectively movable into and out of said core to control reactivity thereof, said fuel assembly comprising an array of a plurality of spaced fuel elements containing new nuclear fuel initially lacking an equilibrium amount of samarium, said new fuel providing a first excess of reactivity in said core to compensate for fuel depletion during operation said core, said fuel providing a second excess of reactivity in said core to compensate for said equilibrim amount of samarium in said new fuel which said new fuel will contain after a period of operation in said core; an initial amount of fixed self-shielded burnable poison in said fuel assembly to control at least a portion of said first excess of reactivity; and an initial amount of fixed dilute gadolinium burnable poison in said fuel assembly to control said second excess of reactivity during the period of samarium build-up in said new fuel to equilibrium to compensate for said intial lack of samarium whereby said dilute burnable poison substantially depletes out of the fuel as the samarium builds up to the equilibrium amount, said dilute gadolinium poison having a density and distribution in the fuel assembly such that the poisson will not be substantially self-shielding, said gadolinium being particularly useful in said fuel assembly as compared to other burnable poisons in that it has both a neutron capture cross section which decreases more rapidly than l/v and than that of Sm-149 over thermal neutron energy range of from 0.005–0.1 electron volts and also provides either an increased "cold" shutdown margin or an increased "hot"operating reactivity margin, said amount of said dilute burnable poison being about 1 to 3 times an amount defined by:

burnable poison atoms/fuel atoms = $Y\ \sigma_f^f/\sigma_c^{bp}$ where $Y$ is the fractional yield of Sm-149 atoms per fission of fuel, $\sigma_f^f$ is the microscopic neutron fission cross section of the fuel, and $\sigma_c^{bp}$ is the microscopic neutron capture cross section of the burnable poison.

5. The fuel assembly of claim 4 wherein said self-shielded burnable poison is gadolinium.

6. The fuel assembly of claim 4 wherein said dilute burnable poison is mixed with the fuel of at least one of said fuel elements.

7. A fuel element for use in a thermal nuclear reactor core, said core including control rods which are selectively movable into and out of said core to control reactivity thereof, said fuel element containing new nuclear fuel initially lacking an equilibrium amount of samarium which said new fuel will contain after a period of operation in said core, said new fuel providing an excess of reactivity to compensate for said equilibrium amount of samarium, and an initial amount of dilute gadolinum burnable poison in said element to absorb neutrons during the period of samarium build up in said fuel element to equilibrium to compensate for said initial lack of samarium and said initial excess of reactivity whereby said burnable poison substantially depletes out of the fuel as the samarium builds up to the equilibrium amount said dilute gadolinium poison having a density and distribution in the fuel assembly such that the poison will not be substantially self-shielding, said gadolinium burnable poison being particularly useful in said fuel element as compared to other burnable poisons in that it has both a neutron capture cross section which decreases more rapidly than l/v and than that of samarium-149 over thermal energy range from 0.005–0.1 electron volts and also provides either an increased "cold" shutdown margin or an increased "hot" operating reactivity margin, said initial amount of burnable poison being substantially defined by:

burnable poison atoms/fuel atoms = $Y\ \sigma_f/\sigma_c^{bp}$ where $Y$ is the fractional yield of Sm-149 atoms per fission of fuel, $\sigma_f$ is the microscopic neutron fission cross section of the fuel, and $\sigma_c^{bp}$ is the microscopic neutron capture cross section of the burnable poison.

8. The fuel element of claim 7 wherein said initial amount of said burnable poison is between about 1 and 3 times the amount defined by:

burnable poison atoms/new fuel atoms = $Y\ \sigma_f/\sigma_c^{bp}$

9. The fuel element of claim 7 where said gadolinium is in the form of an oxide mixed with at least a portion of said new fuel in said fuel element.

* * * * *